United States Patent [19]

Saarem

[11] Patent Number: 4,671,485
[45] Date of Patent: Jun. 9, 1987

[54] SOLENOID-OPERATED PILOT VALVE WITH ADJUSTABLE FLOW CONTROL

[75] Inventor: Myrl J. Saarem, Carson City, Nev.

[73] Assignee: Richdel Div. of Garden America Corp., Oakland, Calif.

[21] Appl. No.: 888,931

[22] Filed: Jul. 24, 1986

[51] Int. Cl.[4] ............................................ F16K 31/385
[52] U.S. Cl. .................................. 251/30.03; 92/13.2; 251/24; 251/42; 251/46; 251/60
[58] Field of Search ................. 92/13.2, 13.6; 251/24, 251/30.03, 42, 46, 60, 285

[56] References Cited

U.S. PATENT DOCUMENTS

| | | | |
|---|---|---|---|
| 2,765,143 | 10/1956 | Best | 251/248 X |
| 4,135,696 | 1/1979 | Saarem et al. | 251/42 X |
| 4,180,236 | 12/1979 | Saarem et al. | 251/42 X |
| 4,505,450 | 3/1985 | Saarem et al. | 251/46 X |

Primary Examiner—Gerald A. Michalsky
Attorney, Agent, or Firm—Keith D. Beecher

[57] ABSTRACT

A solenoid-operated pilot valve of the diaphragm type which includes an assembly for controlling the flow of liquid through the valve. The valve has particular although not exclusive utility for irrigation purposes. The valve includes a diaphragm chamber into which fluid is introduced to establish a fluid pressure which normally forces a diaphragm against an annular seat in the valve to assist a spring in maintaining the valve in a closed condition. A stationary bleed tube is provided which extends through the diaphragm into the diaphragm chamber. A solenoid is mounted on the cap of the valve, and the plunger of the solenoid normally closes off the upper end of the bleed tube. However, when the solenoid is energized, the plunger is withdrawn and the bleed tube opens and drains the diaphragm chamber sufficiently to reduce the pressure therein to a point at which the diaphragm is forced off its seat by upstream fluid pressure, and the valve is opened. A flow adjustment mechanism is mounted in the cap which includes an axially movable gear nut functioning as an adjustable stop for the diaphragm to control the flow of liquid through the valve.

3 Claims, 3 Drawing Figures

SOLENOID-OPERATED PILOT VALVE WITH ADJUSTABLE FLOW CONTROL

BACKGROUND OF THE INVENTION

Solenoid-operated diaphragm valves for use in irrigation systems are known to the art. Valves of this general type are described, for example, in U.S. Pat. No. 3,336,843 and in U.S. Pat. No. 3,410,301. This type of valve includes a diaphragm which moves against or away from an annular seat within the valve to open or close the valve. The diaphragm is normally biased against the seat by a spring and by the fluid pressure in the chamber above the diaphragm acting against the diaphragm. When the valve is to be opened, the fluid pressure in the diaphragm chamber is relieved by causing the fluid to pass out of the diaphragm chamber by a solenoid controlled pilot valve. An improved and simplified construction for such a valve is disclosed in U.S. Pat. No. 4,505,450 which is assigned to the present Assignee.

However, the valve shown in U.S. Pat. No. 4,505,450 does not includes any means for throttling the flow of fluid through the valve when the valve is opened. The present invention is directed to such a valve as disclosed in the patent and which includes a simple adjustable mechanism for controlling the fluid flow through the valve when the valve is opened.

DETAILED DESCRIPTION OF THE ILLUSTRATED EMBODIMENT

Figure 1:
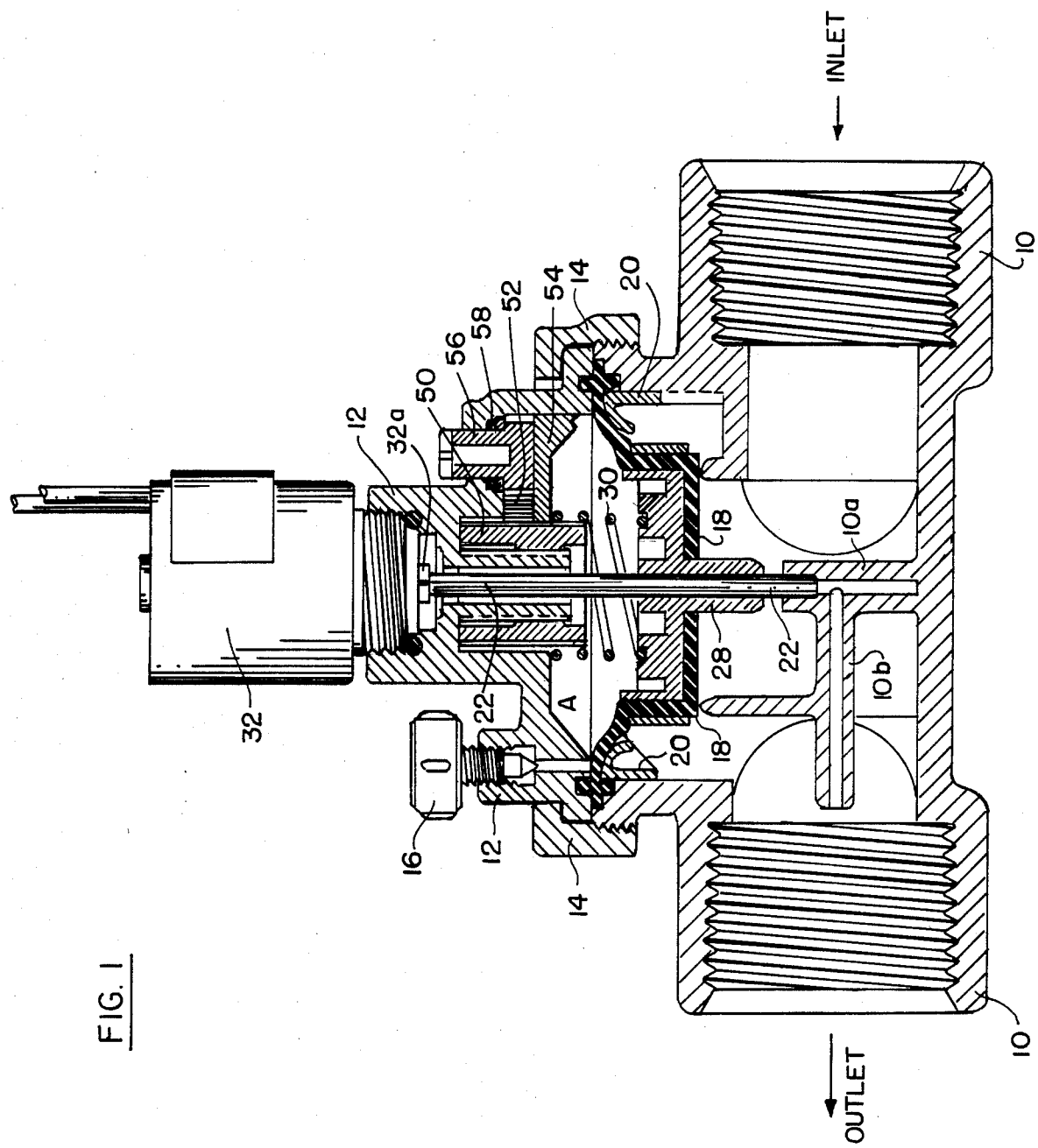
FIG. 1 is a sectional view of a solenoid-controlled diaphragm valve which includes the flow control assembly of the invention.

The valve assembly shown in FIG. 1, like the valve assembly of U.S. Pat. No. 4,505,450 includes a body 10 having an inlet and an outlet. A cap 12 is mounted on, and sealed to body 10 by means of a nut 14. A bleed screw 16 is threaded into a bleed hole in cap 12. A diaphragm 18 is mounted in body 10, and it includes an integral annular sealing bead which is held between the cap and the body by nut 14. An annular divider 20 is also mounted in body 10 to provide a support for the diaphragm.

A bleed tube 22 is mounted in body 10 in press-fit with a vertical hollow support bracket 10a, the support bracket being integral with body 10. Support bracket 10a is also integral with a port 10b which is concentric with the outlet of body 10. Bleed tube 22 extends upwardly through a rigid diaphragm guide 28 into diaphragm chamber A in the upper portion of the valve. Diaphragm guide 28 slides up and down bleed tube 22 as the diaphragm moves. The annular space between bleed tube 22 and guide 28 provides a conduit for the restricted flow of fluid from the inlet of the valve into the diaphragm chamber A. A spring 30 engages the diaphragm guide 28, and the spring biases the diaphragm 18 to a closed position against an annular seat in body 10.

A solenoid 32 is threaded into cap 12, and plunger 32a of the solenoid normally bears against and closes the upper end of bleed tube 22. Plunger 32a has a rubber insert in order to seal the bleed tube when the solenoid is de-energized. The upper end of bleed tube 22 is appropriately formed to provide a smooth concentric sealing surface for the rubber insert.

When solenoid 32 is de-energized, the rubber insert of plunger 32a is biased against the upper end of bleed tube 22 and forms a seal with the bleed tube. This prevents fluid in diaphragm chamber A from exiting through the bleed tube. Thus, the valve remains closed by virtue of the pressure exerted on the upper surface of the diaphragm by the fluid in chamber A, and this pressure forces the diaphragm against the seat in body 10.

When the solenoid is energized, plunger 32a lifts off the end of bleed tube 22, and the fluid in chamber A is then allowed to flow through the bleed tube into the interior of hollow bracket 10a and out through the concentric port 10b. This reduces the pressure in chamber A sufficiently to permit diaphragm 18 to be lifted off its seat against the force of spring 30 by the fluid in the lower portion of the valve.

As the valve is lifted off its seat, the valve opens, and the flow of fluid through body 10 creates a fluid velocity around concentric port 10b at the outlet side of the valve. This creates a venturi action which draws more fluid through the port 10 and through bleed tube 22 from chamber A. This further reduces the pressure on the top side of diaphragm 18 and causes the diaphragm to move farther from its seat increasing the opening of the valve.

In accordance with the present invention, a flow control mechanism is provided in the cap 12 which serves to limit the displacement of the diaphragm by an adjustable amount for throttling the flow of fluid through the valve.

Figure 3:
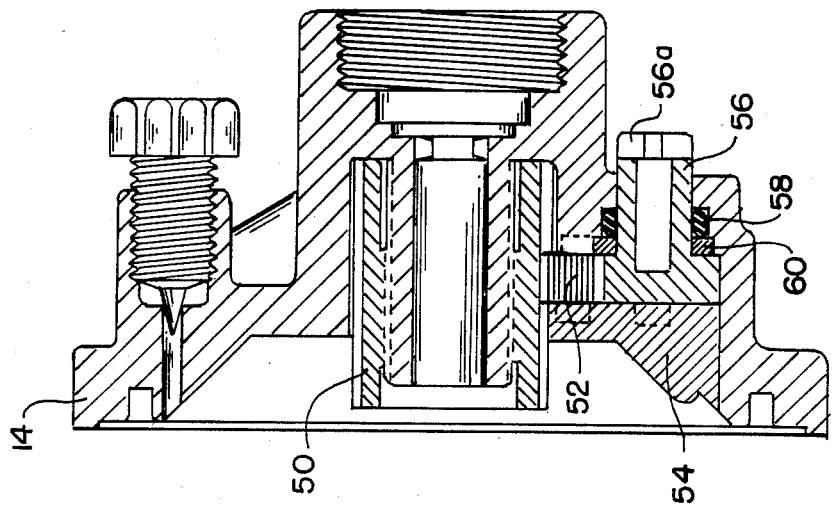
FIG. 3 is a sectional view of the cap of FIG. 2 taken essentially along the line 3—3 of FIG. 2.
Figure 2:
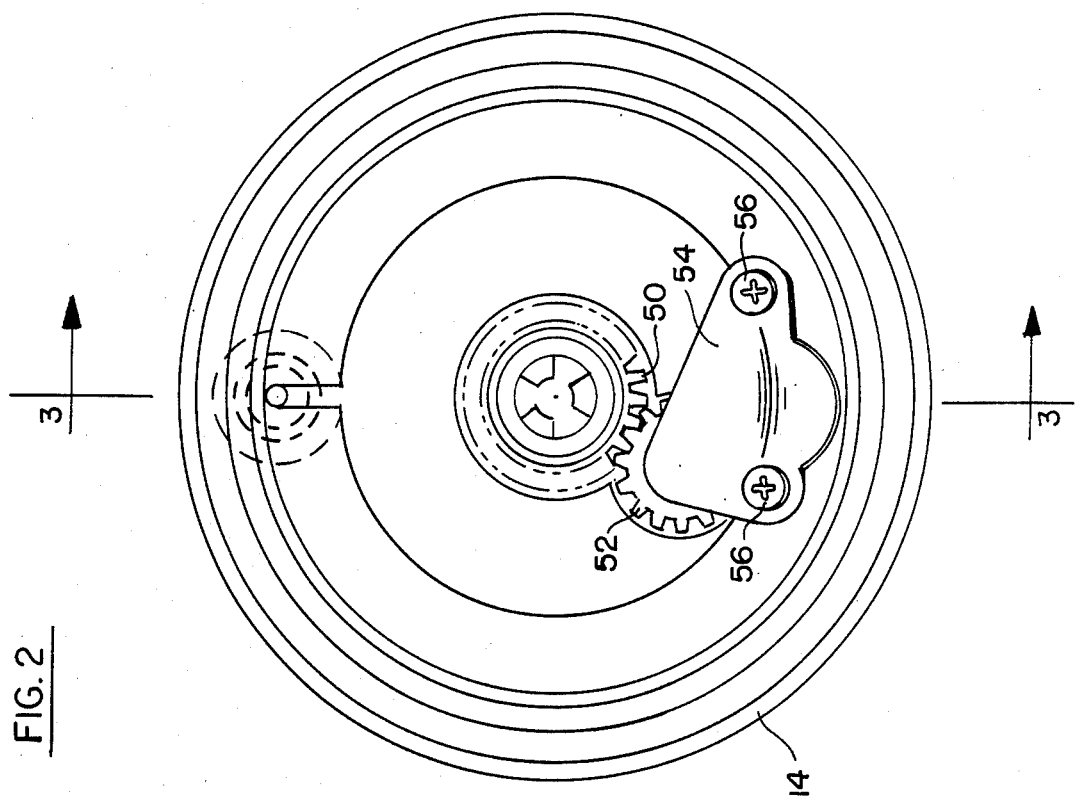
FIG. 2 is a bottom view of the cap of the valve of FIG. 1, showing the flow control assembly.

The flow control mechanism is best shown in FIGS. 2 and 3 and, as illustrated, the mechanism is mounted in cap 12, and it includes a flow adjustment gear 56 rotatably mounted in the cap and sealed by an O-ring 58 which bears against a washer 60. The flow adjustment gear 56 is turned, for example, by means of a screwdriver inserted through a slot in the cap 56a of the gear.

An idler gear 52 is also rotatably mounted in the cap, and it is engaged by gear 56, and serves to couple the gear 56 to a flow adjustment gear nut 50. As gear 56 is turned, the idler gear 52 causes the gear nut 50 to turn and as a result to move axially with respect to the cap. A cover 54 is provided for the gears 56 and 52, which is held in place on the cap by means of screws 57. Gear nut 50 is threaded into a bore in the cap 12 to provide the desired axial movement of the gear nut when it is turned. The end of the gear nut 50 forms a stop for guide 28 so as to restrict the displacement of diaphragm 18 when the valve is opened. The amount of the displacement may be adjusted by turning the flow adjustment gear 56.

Accordingly, the mechanism described above provides a means for throttling the flow of fluid through the valve. The idler gear provides for right-hand rotation of the screwdriver to increase the throttling effect, which is desirable. As an alternative, the idler gear 52 may be eliminated, and left-hand threads may be used to provide a mechanism having the same throttling effect and which also permits right-hand rotation of the screwdriver to cause the valve to throttle, but which requires one less part.

The invention provides, therefore, a simple and economical diaphragm valve which incorporates an adjustable mechanism for controlling the fluid flow through the valve when the valve is open.

While a particular embodiment of the invention has been shown and described, modifications may be made, and it is intended in the claims to cover all modifications which come within the true spirit and scope of the invention.

I claim:

1. In a valve which includes a body having an inlet and an outlet and an internal seat, a cap, a diaphragm mounted in the valve between the body and the cap in position to be biased against the seat to control the flow of fluid through the valve from the inlet to the outlet, a rigid diaphragm guide mounted on said diaphragm, a bleed tube extending through said diaphragm guide into a chamber formed between said guide and said diaphragm, and a solenoid mounted on said cap having a plunger extending into said cap in coaxial relationship with said bleed tube selectively to open and close the upper end of said bleed tube, a flow control mechanism mounted in said cap comprising: an axially movable gear nut for limiting the displacement of said diaphram from said seat, said gear nut being threadably mounted in a bore in said cap coaxially with said bleed tube with said bleed tube extending through said gear nut, and with the said gear nut being positioned to be engaged by said diaphragm guide when said diaphragm is displaced from said seat, and a flow adjustment gear rotatably mounted on said cap and coupled to said gear nut, so that rotation of said flow adjustment gear produces axial movement of said gear nut for setting the axial relationship of said gear nut and said diaphragm guide.

2. The combination defined in claim 1, in which said adjustment gear has a portion extending through said cap and configured to receive an adjustment tool.

3. The combination defined in claim 1, and which includes an idler gear mounted on said cap between said gear nut and said flow adjustment gear for coupling said flow adjustment gear to said gear nut.

* * * * *